US010735774B2

(12) United States Patent
Galpin et al.

(10) Patent No.: US 10,735,774 B2
(45) Date of Patent: Aug. 4, 2020

(54) METHOD AND APPARATUS FOR VIDEO CODING WITH ADAPTIVE CLIPPING

(71) Applicant: InterDigital VC Holdings, Inc., Wilmington, DE (US)

(72) Inventors: Franck Galpin, Thorigne-Fouillard (FR); Fabien Racape, Rennes (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/301,191

(22) PCT Filed: Apr. 26, 2017

(86) PCT No.: PCT/EP2017/059967
§ 371 (c)(1),
(2) Date: Nov. 13, 2018

(87) PCT Pub. No.: WO2017/194312
PCT Pub. Date: Nov. 16, 2017

(65) Prior Publication Data
US 2019/0200044 A1 Jun. 27, 2019

(30) Foreign Application Priority Data

May 13, 2016 (EP) .................................. 16305558
May 26, 2016 (EP) .................................. 16305609

(51) Int. Cl.
*H04N 19/86* (2014.01)
*H04N 19/117* (2014.01)
(Continued)

(52) U.S. Cl.
CPC .......... *H04N 19/86* (2014.11); *H04N 19/117* (2014.11); *H04N 19/136* (2014.11);
(Continued)

(58) Field of Classification Search
None
See application file for complete search history.

(56) References Cited

U.S. PATENT DOCUMENTS 8,184,710 B2  5/2012 Srinivasan et al.
8,730,130 B1  5/2014 Pray et al.
(Continued)

FOREIGN PATENT DOCUMENTS

RU  2355126 C2  5/2009
WO  0064189  10/2000
(Continued)

OTHER PUBLICATIONS

Starosolski, "New simple and efficient color space transformations for lossless image compression", Abstract, Mar. 14, 2019.
(Continued)

*Primary Examiner* — Kate H Luo
(74) *Attorney, Agent, or Firm* — Brian J. Dorini; Xiaoan Lu

(57) ABSTRACT

Clipping may be applied during various operations at an encoder or decoder. The lower and upper bounds for clipping can be differentially encoded with respect to predictors. Fixed predictors can be used, for example, 0 and $2^{bitdepth}$ for the lower and upper bounds, respectively. Adaptive predictors can also be used. Adaptive predictors can be derived from clipping bounds in previously encoded or decoded pictures, or explicitly signaled in a bitstream. Whether to encode the clipping bounds can be determined based on the number of pixels that have values close to the clipping bounds. Additionally, taking advantage of the clipping operation, the prediction residuals can be smoothed, while the distortion for the block may not necessarily increase.

18 Claims, 11 Drawing Sheets

(51) Int. Cl.
   *H04N 19/463* (2014.01)
   *H04N 19/182* (2014.01)
   *H04N 19/82* (2014.01)
   *H04N 19/70* (2014.01)
   *H04N 19/136* (2014.01)
   *H04N 19/176* (2014.01)

(52) U.S. Cl.
   CPC ......... *H04N 19/176* (2014.11); *H04N 19/182* (2014.11); *H04N 19/463* (2014.11); *H04N 19/70* (2014.11); *H04N 19/82* (2014.11)

(56) References Cited

U.S. PATENT DOCUMENTS

| | | |
|---|---|---|
| 2004/0170319 A1 | 9/2004 | Maurer |
| 2007/0171969 A1 | 7/2007 | Han et al. |
| 2011/0228843 A1* | 9/2011 | Narroschke ............ H04N 19/46 375/240.03 |
| 2011/0305277 A1 | 12/2011 | Fu et al. |
| 2013/0083855 A1 | 4/2013 | Kottke |
| 2014/0192862 A1* | 7/2014 | Flynn .................... H04N 19/50 375/240.03 |
| 2016/0012855 A1 | 1/2016 | Krishnan |
| 2018/0176560 A1* | 6/2018 | Mishurovskiy ...... H04N 19/176 |
| 2019/0001437 A1 | 1/2019 | Mathisen et al. |
| 2019/0104330 A1 | 4/2019 | Dore et al. |

FOREIGN PATENT DOCUMENTS

| | | |
|---|---|---|
| WO | 2012095317 | 7/2012 |
| WO | 2016055001 | 4/2016 |

OTHER PUBLICATIONS

Si et al., "Adaptive Rate Control for High Efficiency Video Coding", Abstract, Mar. 14, 2019.

Y-L Chang et al: "CE8 Subtest3—Controlled clipping",4. JCT-VC Meeting; 95. MPEG Meeting; (Joint Collaborative Team on Video Coding of ISO/IEC JTC1/SC29/WG11 and ITU-T SG.16),Jan. 15, 2011.

Y-L Chang et al: "TE10 subtest 3: Controlled clipping",94. MPEG Meeting,(Motion Picture Expert Group or ISO/IEC JTC1/SC29/WG11),n°M18172,Oct. 2, 2010.

Li X et al: "Non-CE4 : Clipping of transformed coefficients before de-quantization",8. JCT-VC Meeting; 99. MPEG Meeting; (Joint Collaborative Team on Video Coding of ISO*IEC JTC1/SC29/WG11 Ans ITU-T SG.16),Jan. 20, 2012.

F. Galpin, et al: "Adaptive Clipping in JEM2.0," Document: JTET-C0040, Joint Video Exploration (JVET) of ITU-T SG 16 WP 3 and ISO/IEC JTC 1/SC 29/WG 11 3rd Meeting: Geneva, CH, May 26-Jun. 1, 2016.

S. Hu, et al: "Adaptive Quantization-Parameter Clip Scheme for Smooth Quality in H.264/AVC," IEEE Transactions on Image Processing, vol. 21, No. 4, pp. 1911-1919, Apr. 2012.

F. Galpin, et al: "Adaptive Clipping in JEM," 2017 Data Compression Conference (DCC), Snowbird, Utah, USA, 2017, pp. 33-41.

\* cited by examiner

METHOD AND APPARATUS FOR VIDEO CODING WITH ADAPTIVE CLIPPING

This application claims the benefit, under 35 U.S.C. § 371 of International Application No. PCT/EP17/059967, filed Apr. 26, 2017, which was published on Nov. 16, 2017, which claims the benefit of European Patent Application Nos. EP16305609.6 filed May 26, 2016 and EP16305558.5 filed May 13, 2016.

TECHNICAL FIELD

The present principles generally relate to a method and an apparatus for video encoding and decoding, and more particularly, to a method and an apparatus for video encoding and decoding with adaptive clipping.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

During various operations in a video compression system, the video data may exceed the data range used to represent the video data. To avoid possible data inversion, for example, a high value exceeding the range of an 8-bit representation may be inadvertently treated as a low value if only the lower eight bits are retained, the video data is usually clipped to a proper range.

SUMMARY

According to a general aspect, a method for encoding a picture into a bitstream is presented, comprising: accessing an upper bound for clipping for a block of the picture and a first predictor for the upper bound; quantizing a first difference between the upper bound and the first predictor; encoding the quantized first difference into the bitstream; de-quantizing the quantized first difference to form a decoded first difference; adjusting values of video data for the block to be smaller than a reconstructed upper bound, the reconstructed upper bound being formed based on the decoded first difference and the first predictor; and encoding the block of the picture into the bitstream.

The encoding method may further comprise: accessing a lower bound for clipping for the block of the picture and a second predictor for the lower bound; quantizing a second difference between the upper bound and the second predictor; encoding the quantized second difference into the bitstream; de-quantizing the quantized second difference to form a decoded second difference; and adjusting values of video data for the block to be greater than a reconstructed lower bound, the reconstructed lower bound being formed based on the decoded second difference and the second predictor.

To reduce distortion, the quantization and de-quantization can be designed such that the reconstructed lower bound is smaller than the lower bound for clipping, and the reconstructed upper bound is greater than the upper bound for clipping.

The first difference can be represented by (bitdepth−1) bits, wherein bitdepth is a bit depth used to represent the video data for the block.

To decide whether or not to apply adaptive clipping, the method may further comprise: determining the number of pixels that have values close to at least one of the upper bound and the lower bound in the block; and determining whether to use the first predictor for encoding the upper bound based on the determined number of pixels.

According to another general aspect, a method for decoding a picture from a bitstream is presented, comprising: accessing a first predictor for an upper bound for clipping for a block of the picture; decoding a quantized first difference from the bitstream to form a decoded first difference; adjusting values of video data for the block to be smaller than a reconstructed upper bound, the reconstructed upper bound being formed based on the decoded first difference and the first predictor; and decoding the block of the picture from the bitstream.

The decoding method may further comprise: accessing a second predictor for a lower bound for clipping for the block of the picture; decoding a quantized second difference from the bitstream to form a decoded second difference; adjusting values of video data for the block to be greater than a reconstructed lower bound, the reconstructed lower bound being formed based on the decoded second difference and the second predictor.

In the encoding or decoding method, the first predictor can be $2^{bitdepth}$ or the first predictor is determined based on a predictor for an upper bound for clipping in a previously encoded or decoded picture. The first predictor may be adapted to content of the block of the picture.

The present embodiments also provide an apparatus for performing these steps.

The present embodiments also provide a computer readable storage medium having stored thereon instructions for encoding a picture into a bitstream or decoding a picture from a bitstream according to the methods described above.

The present embodiments also provide a computer readable storage medium having stored thereon a bitstream generated according to the methods described above.

According to another general aspect, a video signal is formatted to include: an encoded section of a quantized first difference formed by quantizing a first difference between an upper bound for clipping for a block of a picture and a first predictor for the upper bound, wherein the quantized first difference is de-quantized to form a decoded first difference, and values of video data for the block are adjusted to be smaller than a reconstructed upper bound, the reconstructed upper bound being formed based on the decoded first difference and the first predictor.

According to another general aspect, a method for encoding a picture is presented, comprising: accessing an original block to be encoded, a prediction block and a residual block corresponding to the original block; determining that a first element in the original block or the prediction block is close to an upper bound for clipping; replacing a first element in the residual block corresponding to the first element in the original block or the prediction block with a first value that is greater than the first element in the residual block; encoding and decoding the residual block with the replaced element to form a decoded residual block; forming a reconstructed block based on the prediction block and the decoded residual block; and replacing a first element in the reconstructed block corresponding to the first element in the residual block with the upper bound for clipping if the first element in reconstructed block exceeds the upper bound for clipping.

The method may further comprise: determining that a second element in the original block or the prediction block is close to a lower bound for clipping; replacing a second element in the residual block corresponding to the second element in the original block or the prediction block with a second value that is smaller than the second element in the residual block; replacing a second element in the reconstructed block corresponding to the second element in the residual block with the lower bound for clipping if the second element in the reconstructed block is smaller than the lower bound for clipping.

The first value may be a low-pass filtered value of the block.

To determine that the first element in the original block or the prediction block is close to an upper bound for clipping, a threshold can be used. In one example, the threshold is 0. In another example, the threshold increases with a quantization parameter corresponding to the residual block.

The present embodiments also provide an apparatus for performing these steps.

The present embodiments also provide a computer readable storage medium having stored thereon instructions for encoding a picture according to the methods described above.

The present embodiments also provide a computer readable storage medium having stored thereon a bitstream generated according to the methods described above.

DETAILED DESCRIPTION

Figure 1:
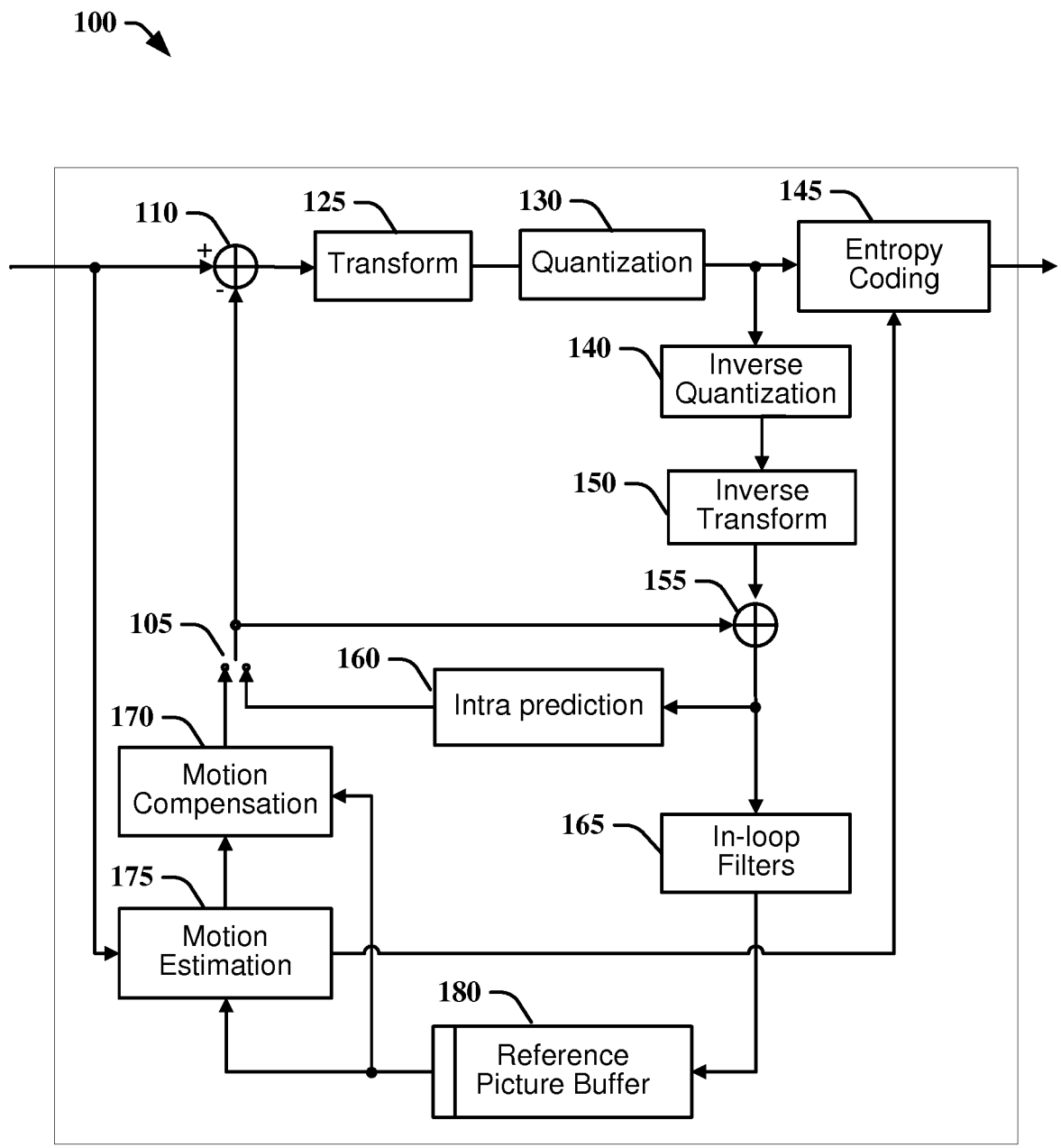
FIG. 1 illustrates a block diagram of an exemplary HEVC (High Efficiency Video Coding) encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, a picture is partitioned into coding tree blocks (CTB) of square shape with a configurable size, and a consecutive set of coding tree blocks is grouped into a slice. A Coding Tree Unit (CTU) corresponding to a CTB contains the CTBs of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can be used to refer to a macroblock, a partition and a sub-block as specified in H.264/AVC or other video coding standards, and more generally to refer to an array of samples of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference pixels can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference index) can be signaled in two methods, namely, "advanced motion vector prediction (AMVP)" and "merge mode." In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference picture index are reconstructed based on the signaled candidate.

In HEVC, the precision of the motion information for motion compensation is one quarter-sample for the luma component and one eighth-sample for the chroma components. A 7-tap or 8-tap interpolation filter is used for interpolation of fractional-sample pixel positions, i.e., ¼, ½ and ¾ of full pixel locations in both horizontal and vertical directions can be addressed for luma.

The prediction residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. A filter is applied to the reconstructed picture (165), for example, to perform deblocking/SAO (Sample Adaptive Offset) filtering to reduce blockiness artifacts. The filtered image is stored at a reference picture buffer (180).

Figure 2:
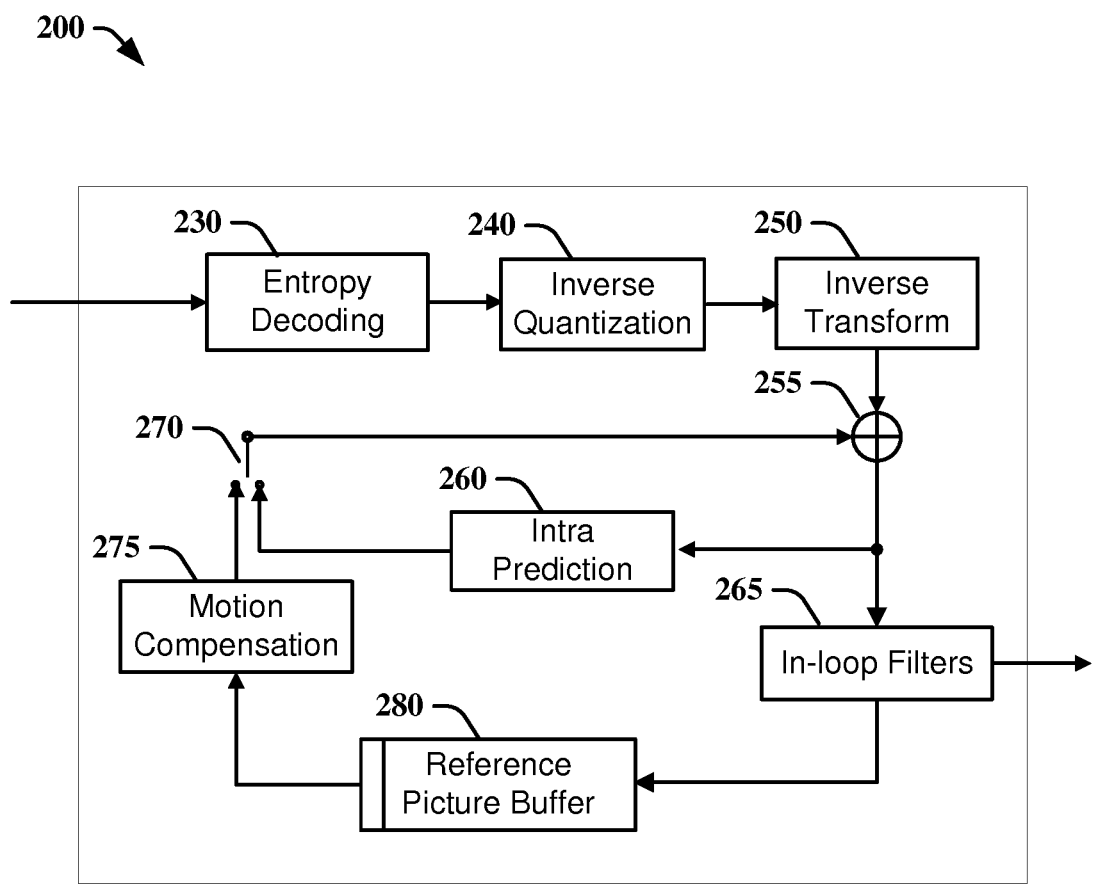
FIG. 2 illustrates a block diagram of an exemplary HEVC video decoder.

FIG. 2 illustrates a block diagram of an exemplary HEVC video decoder 200. In the exemplary decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed.

The predicted block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer pixels of a reference block. A filter (265) is applied to the reconstructed image. The filtered image is stored at a reference picture buffer (280).

To avoid data overflow or underflow, clipping is specified in various processes in an HEVC decoder. Different clipping functions are defined in HEVC, for example:

$$ClipY(x)=Clip3(0,(1<<BitDepthY)-1,x)$$

$$ClipC(x)=Clip3(0,(1<<BitDepthC)-1,x) \quad (1)$$

where Y and C denote the luma and chroma components, respectively, BitDepthY and BitDepthC are the internal bit depths (for example 8 or 10) for the luma and chroma, respectively, and Clip3 is a function to clip a value z between two bounds x and y.

$$Clip3(x, y, z) = \begin{cases} x; & z < x \\ y; & z > y \\ z; & \text{otherwise} \end{cases} \quad (2)$$

The clipping may be applied during or after various operations, for example, at or after weighted prediction, prediction, intra prediction filter, adaptive loop filter (ALF), deblocking filter, SAO filter and when the decoded residual is added to the prediction. Additionally, to further improve the performance of HEVC, clipping can also be applied at PDPC (Position dependent intra prediction combination) as developed in the reference software JEM (Joint Exploration Model) by the Joint Video Exploration Team (JVET).

The clipping process is typically done by:

$$x_c=\text{clip}(x)=\min(B_U,\max(B_L,X)) \quad (3)$$

where $B_L$ and $B_U$ are the lower and upper bounds of clipping respectively, and value x is clipped to value $x_c$ within the range of $B_L$ to $B_U$. For example, default clipping bounds can be $B_L=0$ and $B_U=255$ for an 8-bit IBD (Internal Bith Depth), and $B_L=0$ and $B_U=1023$ for a 10-bit IBD.

U.S. application Ser. No. 12/954,844 by Chih-Ming Fu et al. discloses a content adaptive clipping method that takes into account the dynamic characteristics of the video data, wherein the method configures the video data into a predefined set which can be a partial picture, a frame or a group of frames. The data range of the original video data associated with the predefined set is determined, and the processed video data is clipped according to the range computed for the predefined set. The range information may be carried in the Sequence Parameter Set (SPS), Picture Parameter Set (PPS), slice header or coding unit header.

A commonly owned EP application, entitled "Methods and devices for encoding and decoding a sequence of pictures, and corresponding computer program products and computer-readable medium." by P. Bordes, et al. (EP15306369.8), the teachings of which are specifically incorporated herein by reference, discloses a method of clipping one color component adaptive to another color component. In one embodiment, the range for a sample of a chroma component is provided as a function of the sample value in the luma component.

The present principles are directed to adaptive clipping in video encoding and decoding. In one embodiment, we propose to encode the clipping parameters that are adaptive to the contents. The clipping parameters, including, but not limited to, a flag indicating whether or not adaptive clipping is used, a flag indicating the type of method to encode the clipping bounds, the lower and upper bounds for clipping, can be indicated for a sequence or a group of pictures, or at a picture or slice level. For example, the clipping parameters can be indicated in video parameter set (VPS), SPS, PPS, a slice header or a CTU header. In case of scalable video coding, the clipping parameters can be indicated for individual layers. The clipping bounds may be pre-determined constants, signal bounds, or may be generated based on the probability distribution of the video data. The clipping bounds may be used as post-processing on the reconstructed pictures only, or the clipping bounds may be used in one or more clipping operations inside the encoder or decoder.

Figure 3:
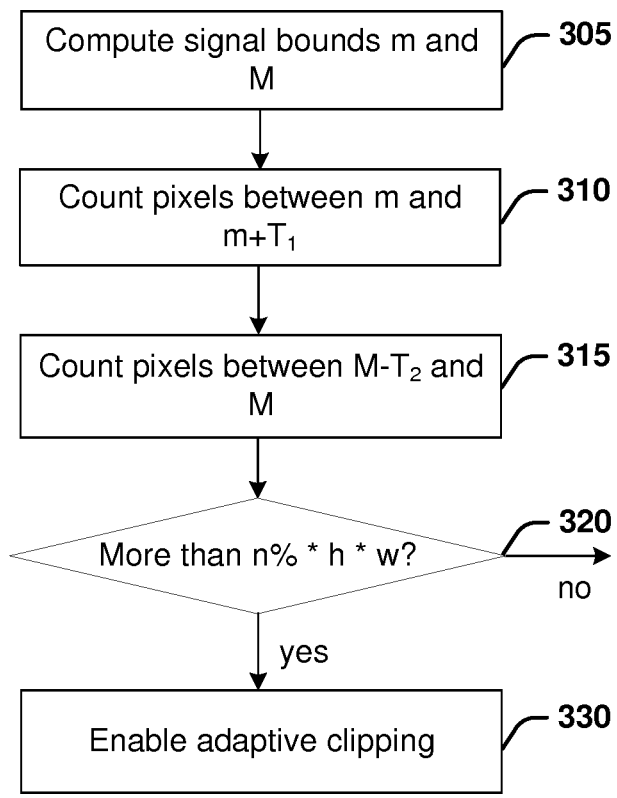
FIG. 3 depicts an exemplary method for determining whether or not to enable adaptive clipping at an encoder, according to an embodiment of the present principles.

FIG. 3 depicts an exemplary method 300 for determining whether or not to enable adaptive clipping at an encoder, according to an embodiment of the present principles.

At step 305, the encoder computes the smallest pixel value (m) and the largest pixel value (M) in a picture. Then the encoder determines how many pixels in the picture have pixel values close to the signal bounds m and M. For example, the encoder counts (310) the number of pixels ($N_m$) with pixel values between m and $m+T_1$, where $T_1$ is a parameter, and counts (315) the number of pixels ($N_M$) with pixel values between $M-T_2$ and M, where $T_2$ is a parameter. Based on the numbers $N_m$ and $N_M$, the encoder may determine an indication (N) of the number of pixels that are close to signal bounds, for example, using an average, combination, or maximum function of $N_m$ and $N_M$. If the number N is greater than n %*h*w (320), wherein n % is a threshold value, h and w are the number of pixels in the vertical and horizontal directions of the picture, then a sufficient amount of pixels may be adjusted by the clipping operation. Therefore, adaptive clipping may be enabled for the picture (330), and the clipping bounds would be signaled in the bitstream. Otherwise, adaptive clipping is not enabled for the picture, and the clipping based on $B_L=0$ and $B_U=2^{bitdepth}-1$ can be used. In a variant, the number N can be compared to a fixed threshold T independent of the image size.

In addition, the encoder may also check the quantization parameter, picture type or temporal level of a picture. When the quantization parameter is large, the temporal level is high, or the picture type is B, the coding size of the picture usually is small, and signaling the clipping parameters may introduce a relatively large overhead. Thus, for a picture expected to have a small coding size, we may disable adaptive clipping to avoid the extra overhead. For a picture expected to have a large coding size, for example, an Intra picture or a first Inter picture in a group of pictures, we may enable adaptive clipping.

The coding size consideration can be integrated into method 300 by adjusting the threshold value n %, and parameters $T_1$ and $T_2$. For example, we may set n % to a small value for a picture expected to have a large coding size (i.e., the condition to enable adaptive clipping is easy to satisfy), and set n % to a large value for a picture expected to have a small coding size.

The encoder may perform step 310 conditionally, for example, the encoder only performs step 310 if $m>B_L=0$. Similarly, the encoder may perform step 315 conditionally, for example, the encoder only performs step 315 if $M<B_U 2^{bitdepth}-1$. This is because when $m<B_L=0$ or $M>B_U=2^{bitdepth}-1$, non-adaptive clipping with $B_L=0$ and $B_U=2^{bitdepth}-1$ may perform better than adaptive clipping.

In another example, when the quantization parameter is high, the distortion is high, and it may be more useful to apply clipping in order to reduce the distortion. Thus, we may increase parameters $T_1$ and $T_2$ as the quantization parameter increases. The encoder can also consider both the coding size (i.e., the bitrate) and the distortion when deciding parameters n %, $T_1$ and $T_2$.

Method 300 describes a method when adaptive clipping is performed at a picture level. Method 300 can also be adjusted accordingly when adaptive clipping is performed at the sequence level, the slice level, the CTU level, or other coding levels. In another variation, the encoder can also check the number of pixels that are close to the clipping bounds, instead of the signal bounds, to determine whether or not to enable adaptive clipping. When adaptive clipping is performed at a low level, for example, at a CTU level, the decision may be made before encoding the CTUs, and flags to indicate whether to enable adaptive clipping for individual CTUs can be entropy encoded.

Figure 4A:
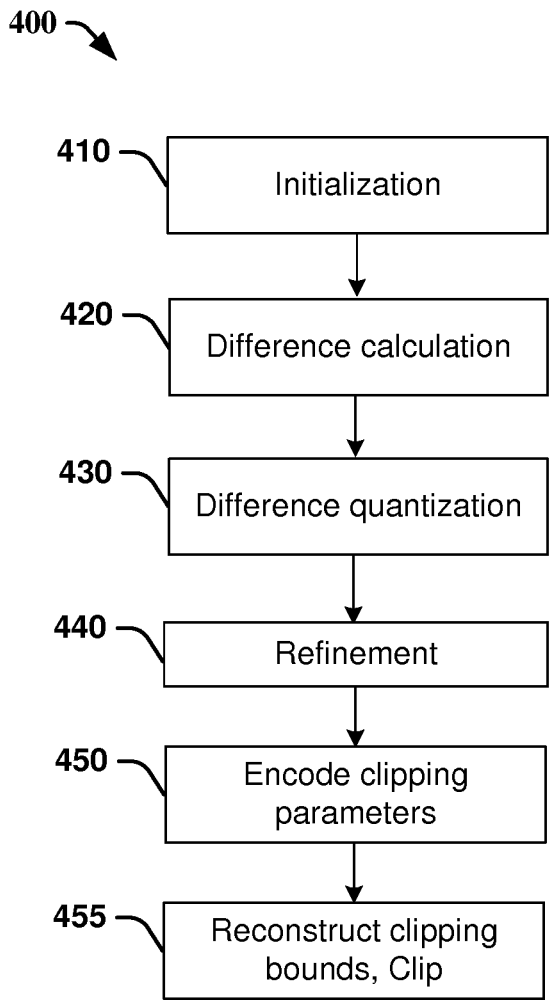
FIG. 4A depicts an exemplary method for encoding clipping bounds, according to an embodiment of the present principles.

FIG. 4A depicts an exemplary method 400 for encoding clipping bounds, according to an embodiment of the present principles.

At step 410, the encoder performs initialization steps, for example, accessing the bit depth (bitdepth) used to represent the video data, the clipping bounds of the video data ($Y_{low}$, $Y_{high}$), and the number of bits of a quantizer (qshift) used to quantize the clipping parameters. Note that the encoder may use one bit depth (e.g., 8-bit) for representing the input/output data, and other bit depths (e.g., 10-bit, 12-bit) for internal encoding processes. Here the value of variable "bitdepth" corresponds to the bit depth used to represent the data at the stage when clipping occurs. For example, bitdepth=8 when clipping is applied to decoded output video data, and bitdepth=10 when clipping is applied after intra prediction, or other modules which operate at the internal bit depth of 10.

In a specific embodiment, the encoder may derive values of the predictors (also called reference clipping bounds) used for computing differences (at step 420) during the initialization step. FIG. 4C depicts an exemplary method for deriving the reference predictors in the case where the clipping values are stored at the slice/picture level and accessed with a rule compatible with the rules used to access the frames in a Reference Picture List, i.e., a list of reference pictures that is used for inter prediction. In this case, already decoded clipping bounds attached to an already decoded picture as well as the corresponding POC are stored with the said picture in a Reference Picture Set (RPS), i.e., a set of reference pictures associated with a picture, consisting of all reference pictures that are prior to the associated picture in decoding order, that may be used for inter prediction of the associated picture or any picture following the associated picture in decoding order.

At step 1410, if the current picture contains an intra coded slice, no reference predictors are set (1412). Otherwise, bestDeltaPOC is initialized at step 1413. As an example, bestDeltaPOC (best difference of POC) is initialized to the infinity. The POC is a variable that is associated with each picture and that uniquely identifies the associated picture among all pictures in the coded video sequence. In the following, POC_ref is the POC of the reference picture and POC_current is the POC of the current picture to be coded.

At step 1414, a loop over all reference pictures in the RPS begins. If the picture of the RPS is used as a reference to code the current picture (1415), then the method continues at step 1416, otherwise the method continues at step 1421. If the clipping bounds of the reference picture are enabled (1416), then the method continues at step 1417, otherwise the method continues at step 1421. If the difference of POC deltaPOC is smaller than the best difference of POC found so far in absolute value (1417), then the method continues at step 1420, otherwise it continues at step 1418. If the deltaPOC and bestDeltaPOC are equal in absolute value (1418), then the method continues at step 1419 otherwise it continues at step 1421. If the difference of POC is positive (in a variant negative) (1419), then the method continues at step 1420 otherwise the method continues at step 1421. At step 1420, the best difference of POC (bestDeltaPOC) and the best POC (bestPOC) are set equal to the difference of POC and to the POC of the currently processed reference picture respectively. When all pictures in the RPS are processed, the loop ends (1421) and the method continues at step 1422. If the best difference of POC (bestDeltaPOC) is equal to its initial value (1422), then the method continues at step 1412. Otherwise, the reference clipping bounds are set equal (per component cdx) to the decoded clipping bounds of the reference picture whose POC is equal to bestPOC (1423). These reference clipping bounds are called ClipMinRefVal[cdx] and ClipMaxRefVal[cdx] in the following.

In a variant, if step 1416 is omitted, the clipping bounds of the reference picture without activated clipping bounds are set to the conventional clipping values (i.e., 0 for the lower bound and $(1<<\text{BitDepth})-1$ for the upper bound).

Fixed Predictors

To improve compression efficiency, the clipping bounds may be differentially encoded. For the luma bounds, the lower bound is likely to be close to 0 and the upper bound to $2^{bitdepth}$, we can calculate (420) the differences as:

$$A_d = Y_{low}, B_d = 2^{bitdepth} - Y_{high} \quad (4)$$

where $Y_{low}$ and $Y_{high}$ are the lower and upper bounds of the clipping for the luma component, respectively. Here, 0 and $2^{bitdepth}$ can be viewed as predictors for $Y_{low}$ and $Y_{high}$, respectively. Since 0 and $2^{bitdepth}$ do not vary with the content, we also call them as fixed predictors for the clipping bounds, and call the encoding method as a differential encoding method with fixed predictors. Other fixed predictors can also be used, for example, 64 and 940 for limited range data in 10 bits. Because the fixed predictors are known or can be generated at both the encoder and decoder, generally the values of fixed predictors do not need to be transmitted in the bitstream.

Note that the difference for the upper bound is calculated using $2^{bitdepth}$, instead of $2^{bitdepth}-1$. This may allow quantization and de-quantization of the difference without loss at the clipping bound.

We observe from experiments that the lower clipping bound usually is smaller than half of the maximum value that can be represented by the bit depth (i.e., $Y_{low} < 2^{bitdepth-1}$), and the upper clipping bound usually is greater than half of the maximum value that can be represented by the bit depth (i.e., $Y_{high} > 2^{bitdepth-1}$). Thus, $A_d$ and $B_d$ can be represented with a bit depth of $(bd_d = bitdepth-1)$. Therefore, some bits can be saved when encoding $A_d$ and $B_d$ using fixed length code.

At step 430, the differences are quantized, which may be useful since most content is still in 8-bit while the internal bit depth of an encoder is 10 or even higher. Quantization here can reduce the dynamic range of the differences to be encoded without sacrificing much in terms of accuracy.

Quantization may be performed as a right shift by qshift bits:

$$A_q = A_d >> q\text{shift}, B_q = B_d >> q\text{shift} \quad (5)$$

Note that $A_d$ and $B_d$ are non-negative. The choice of the quantizer may be based on the bit depth ($bitdepth_o$) used for representing the original video data and the bit depth at the clipping stage (bitdepth). In one example, qshift is chosen based on the difference between bitdepth and $bitdepth_o=8$ as shown in TABLE 1, in order for the quantization of the differences to cancel out the upscaling caused by internal bit depth increase at an encoder.

TABLE 1

| bitdepth | "qshift" value | qshift_idx_numbits | qshift_idx |
|---|---|---|---|
| 8 | 0 | "qshift_idx" not coded, inferred to be 0 | 0 |
| 8 < bitdepth ≤ 10 | 2 | 1 | 1 |
| 10 < bitdepth ≤ 12 | 4 | 2 | 2 |
| 12 < bitdepth ≤ 14 | 6 | 2 | 3 |

Using this quantization method, the reconstructed values can be calculated by reverse shifting (without rounding):

$$\widehat{Y_{low}} = \widehat{A_d} = A_q << q\text{shift}$$

$$\widehat{Y_{high}} = 2^{bitdepth} - \widehat{B_d} = 2^{bitdepth} - (B_q << q\text{shift}) \quad (6)$$

After quantization and de-quantization, the reconstructed value $\widehat{Y_{low}}$ for the lower bound is generally smaller than the lower bound before encoding ($\widehat{Y_{low}}$), and the reconstructed value $\widehat{Y_{high}}$ for the upper bound is generally greater than the upper bound before encoding ($\widehat{Y_{high}}$).

Adaptive Predictors

In another embodiment, we may also vary predictors for the lower and upper clipping with the content. We call them adaptive predictors for clipping bounds, and we call the encoding method as a differential encoding method with adaptive predictors. Using the adaptive predictors ($pred_l$, $pred_u$) we can calculate (420) the differences as:

$$A_d = Y_{low} - pred_l, B_d = Y_{high} - pred_u \quad (7)$$

Note that $A_d$ and $B_d$ are calculated based on adaptive predictors, and the values may be positive, zero or negative. Therefore, we adjust the quantization processes as described in Eq. (5) to quantize the differences. For the lower bound difference, quantization may be performed as:

If $A_d > 0, A_q = A_d >> q\text{shift}$

Else $A_q = -1 * ((|A_d| + (1 << q\text{shift})-1)) >> q\text{shift}) \quad (8)$ For the upper bound difference, quantization may be performed as:

If $B_d < 0, B_q = -1 * (|B_d| >> q\text{shift})$

Else $B_q = (B_d + (1 << q\text{shift})-1)) >> q\text{shift} \quad (9)$

The reconstructed difference values can be calculated by reverse shifting $$\widehat{A_d} = \text{sign}(A_q) * (|A_q| << q\text{shift}), \widehat{B_d} = \text{sign}(B_q) * (|B_q| << q\text{shift}), \quad (10)$$

and the reconstructed clipping bounds are:

$$\widehat{Y_{low}} = \widehat{A_d} + pred_l, \widehat{Y_{high}} = \widehat{B_d} + pred_u \quad (11)$$

Using the quantization methods as described in Eqs. (8) and (9), the reconstructed value $\widehat{Y_{low}}$ for the lower bound is generally smaller than the lower bound before encoding ($Y_{low}$), and the reconstructed value ($\widehat{Y_{high}}$) for the upper bound is generally greater than the upper bound before encoding ($Y_{high}$).

Figure 5:
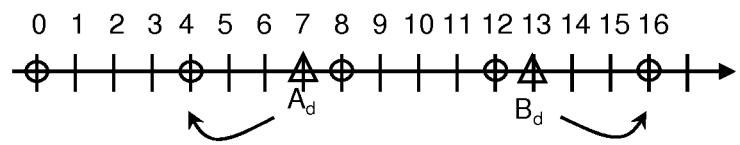
FIG. 5 illustrates the quantization and de-quantization for $A_d$ and $B_d$ using an example.

FIG. 5 illustrates the quantization and de-quantization for $A_d$ and $B_d$ using an example. In this example, we set qshift=2, $A_d$=7, $B_d$=13, $pred_l$=2, $pred_u$=800, $Y_{low}$=9, $Y_{high}$=813. At quantization $A_q$=7>>2=1, $B_q$=(13+(1<<2)-1)>>2=4, and at de-quantization $\widehat{A_d}$=1<<2=4, $\widehat{B_d}$=4<<2=16. In this example, the reconstructed lower clipping bound is smaller than the lower bound before encoding, and the reconstructed upper clipping bound is greater than the upper bound before encoding, i.e., $\widehat{Y_{low}}$=4+2=6<$Y_{low}$=9 and $\widehat{Y_{high}}$=16+800=816>$Y_{high}$=813. Thus, while the input original clipping bounds keep the pixel values at 9~813, the reconstructed clipping bounds would keep the pixel values at 6~816. Usually the distortion caused by expanding the clipping range is smaller than the distortion caused by compacting the clipping range. Thus, the proposed quantization may benefit the compression efficiency by reducing the distortion.

It should be noted that other quantization and inverse quantization methods can be used for quantizing and reconstructing the clipping bounds. Optionally, a refinement for $\widehat{Y_{low}}$ can also be calculated (440) and indicated in the bitstream:

$$A_r = Y_{low} - \widehat{Y_{low}} \quad (12)$$

When a refinement is used, the reconstructed clipping bounds should also include the refinement value.

For the encoder and decoder to perform the same clipping operation, the reconstructed clipping bounds are used at the encoder side to clip the video data (455), while the decoded clipping bounds are used at the decoder side to clip the video data. In the present application, we may refer to "reconstructed" and "decoded" interchangeably.

At step 450, the quantized differences (i.e., $A_q$, $B_q$) and optionally the refinement values (i.e., $A_r$, $B_r$) are encoded. The refinement values may be encoded using variable length coding. The adaptive predictors (i.e., $pred_l$, $pred_u$) may also be encoded into the bitstream.

TABLE 2 illustrates an exemplary syntax table when the clipping parameters are signaled at the slice header. In this example, refinement is not considered. The syntax elements can also be signaled at the picture level, the sequence level, the CTU level, and other coding levels.

TABLE 2

| | Descriptor |
|---|---|
| slice_header( ) { | |
| ... | |
|   if ( adaptive_clipping_enabled_flag ) { | |
|     adaptive_clipping_slice_flag | u(1) |
|     if ( adaptive_clipping_slice_flag ) { | |
|       clip_code_fixed_predictor_flag | u(1) |
|       if ( bitdepth > 8 & clip_code_fixed_predictor_flag ) { | |
|         qshift_idx | u(v) |
|       } | |
|       if (clip_code_fixed_predictor_flag ) { | |
|         CodeClipping_fixed_predictor( 0 ) | |
|         CodeClipping_fixed_predictor( 1 ) | |
|         CodeClipping_fixed_predictor( 2 ) | |

TABLE 2-continued

| | Descriptor |
|---|---|
|       else { | |
|         CodeClipping_adaptive_predictor( 0 ) | |
|         CodeClipping_adaptive_predictor( 1 ) | |
|         CodeClipping_adaptive_predictor( 2 ) | |
|       } | |
|     } | |
|   } | |
| ... | |
| } | | adaptive_clipping_slice_flag equal to 1 activates the adaptive clipping for the current slice. If not activated, default clipping bounds are used for clipping (typically 0 and (1<<bitdepth)−1 for lower and upper bounds, respectively).

qshift_idx specifies the value of qshift as specified in TABLE 1. Note that when encoding a video sequence, a first slice is encoded using fixed predictors for the clipping bounds. Hence the value of qshift for the following slices can be obtained from the first slice.

TABLE 3

| | Descriptor |
|---|---|
| CodeClipping_fixed_predictor( cIdx ) { | |
|   clip_min_delta_quant_fixed_predictor[cIdx] | u(v) |
|   clip_max_delta_quant_fixed_predictor[cIdx] | u(v) |
| } | | clip_min_delta_quant_fixed_predictor[cIdx] specifies the quantized value of the lower clipping bound difference for the color component cIdx. The number of bits used to represent clip_min_delta_quant_fixed_predictor[cIdx] is ($bd_d$−qshift), wherein $bd_d$ is the number of bits used to represent the clipping bound difference (e.g., $A_d$, $B_d$ as in Eq. (4)). Descriptor u(v) represents a parsing process as unsigned integer, while "v" in the syntax table indicates that the number of bits varies in a manner dependent on the value of other syntax elements.

clip_max_delta_quant_fixed_predictor[cIdx] specifies the quantized value of the upper clipping bound difference for the color component cIdx. The number of bits used to represent clip_max_delta_quant_fixed_predictor[cIdx] is ($bd_d$−qshift).

TABLE 4

| | Descriptor |
|---|---|
| CodeClipping_adaptive_predictor( cIdx , Cmin, Cmax ) { | |
|   clip_min_delta_quant_adaptive_predictor[cIdx] | se(v) |
|   clip_max_delta_quant_adaptive_predictor[cIdx] | se(v) |
| } | | clip_min_delta_quant_adaptive_predictor[cIdx] specifies the quantized value of the lower clipping bound difference for the color component cIdx. Descriptor se(v) represents a parsing process as signed integer 0-th order Exp-Golomb-coded syntax element with the left bit first.

clip_max_delta_quant_adaptive_predictor[cIdx] specifies the quantized value of the upper clipping bound difference for the color component cIdx.

At encoder and decoder initialization, the values of lower and upper clipping bounds, ClipMinRefVal[cIdx] and ClipMaxRefVal[cIdx] may be set equal to 0 and (1<<BitDepth

[cIdx])−1 respectively, wherein BitDepth is the internal bit depth for the color component cIdx.

If adaptive_clipping_slice_flag is equal to 1:

If clip_code_fixed_predictor_flag is equal to 1, the predictors PredictorMin[cIdx] and PredictorMax[cIdx] are set to 0 and (1<<BitDepth[cIdx]), respectively. The values clip_min_delta_quant[cIdx] and clip_max_delta_quant[cIdx] are derived as follows:

clip_min_delta_quant[cIdx]=clip_min_delta_quant_fixed_predictor[cIdx]

clip_max_delta_quant[cIdx]=clip_max_delta_quant_fixed_predictor[cIdx]

The values of decoded lower and upper clipping bounds, ClipMinVal[cIdx] and ClipMaxVal[cIdx] are derived as follows:

ClipMinVal[cIdx]=PredictorMin[cIdx]+(clip_min_delta_quant[cIdx]<<qshift)

ClipMaxVal[cIdx]=PredictorMax[cIdx]−(clip_max_delta_quant[cIdx]<<qshift)

if (ClipMaxVal[cIdx]>(1<<BitDepth)−1) ClipMaxVal[cIdx]=(1<<BitDepth)−1;

Otherwise (if clip_code_fixed_predictor_flag is equal to 0), clip_min_delta_quant[cIdx] and clip_max_delta_quant[cIdx] are derived as follows:

clip_min_sign[cIdx]=Sign(clip_min_delta_quant_adaptive_predictor[cIdx])

clip_max_sign[cIdx]=Sign(clip_max_delta_quant_adaptive_predictor[cIdx])

clip_min_delta_quant[cIdx]=Abs(clip_min_delta_quant_adaptive_predictor[cIdx])

clip_max_delta_quant[cIdx]=Abs(clip_max_delta_quant_adaptive_predictor[cIdx])

where $$\mathrm{Sign}(x) = \begin{cases} 1; & x > 0 \\ 0; & x = 0 \\ -1; & x < 0 \end{cases} \qquad (13)$$

The values of lower and upper bound predictors, PredictorMin[cIdx] and PredictorMax[cIdx] may be updated to the last decoded ClipMinRefVal[cIdx] and ClipMaxRefVal[cIdx], respectively. Another update policy is to set PredictorMin[cIdx] and PredictorMax[cIdx] to the ClipMinVal[cIdx] and ClipMaxVal[cIdx] of the temporally closest decoded frame available in the reference picture buffer of the current frame to decode. Another update policy is to set PredictorMin[cIdx] and PredictorMax[cIdx] to the ClipMinRefVal[cIdx] and ClipMaxRefVal[cIdx] of the temporally closest decoded frame available in the reference picture buffer of the current frame to decode.

The values of the lower and upper clipping bounds, ClipMinVal[cIdx] and ClipMaxVal[cIdx] are derived as follows:

ClipMinVal[cIdx]=PredictorMin[cIdx]+clip_min_sign[cIdx]*(clip_min_delta_quant[cIdx]<<qshift)

ClipMaxVal[cIdx]=PredictorMax[cIdx]+clip_max_sign[cIdx]*(clip_max_delta_quant[cIdx]<<qshift)

If adaptive_clipping_slice_flag is equal to 0, the values of ClipMinVal[cIdx] and ClipMaxVal[cIdx] are set equal to 0 and (1<<BitDepth)−1, respectively.

In the above, encoding clipping parameters at a slice level is discussed. When the clipping parameters are encoded at a lower level, for example, at a CTU level, the difference can be computed using a contextual predictor, for example using the values of the last CTU, the co-located CTU of the closet frame in the reference picture buffer, or an average of surrounding CTU values.

In the specific case where the clipping parameters are encoded at a picture level, an alternative syntax may be defined as depicted in TABLE 5 and TABLE 6. In this syntax, the clipping parameters are encoded in the first slice only in order to be set at the picture level. Alternatively, qshift_idx is encoded at the PPS level and is common for all pictures. In this case, adaptive_clipping_slice_flag equal to 1 activates the adaptive clipping for the current picture. adaptive_clipping_enabled_flag equal to 1 enable the adaptive clipping for the whole sequence.

TABLE 5

|  | Descriptor |
|---|---|
| pps_header( ) { | |
| ... | |
|    adaptive_clipping_enabled_flag | u(1) |
|    if (adaptive_clipping_enabled_flag) { | |
|       qshift_idx | u(1) |
|    } | |

TABLE 6

|  | Descriptor |
|---|---|
| slice_header( ) { | |
| ... | |
|   if (first_slice_segment_in_pic_flag) { | |
|     if ( adaptive_clipping_enabled_flag ) { | |
|       adaptive_clipping_slice_flag | u(1) |
|       if ( adaptive_clipping_slice_flag ) { | |
|         if (slice intra) { | |
|           clip_code_fixed_predictor_flag=1 | |
|         } else { | |
|           clip_code_fixed_predictor_flag | u(1) |
|         } | |
|         if (clip_code_fixed_predictor_flag ) { | |
|           CodeClipping_fixed_predictor( 0 ) | |
|           CodeClipping_fixed_predictor( 1 ) | |
|           CodeClipping_fixed_predictor( 2 ) | |
|         } else { | |
|           CodeClipping_adaptive_predictor( 0 ) | |
|           CodeClipping_adaptive_predictor( 1 ) | |
|           CodeClipping_adaptive_predictor( 2 ) | |
|         } | |
|       } | |
|     } | |
|   } | |
| ... | |
| } | |

Figure 4B:
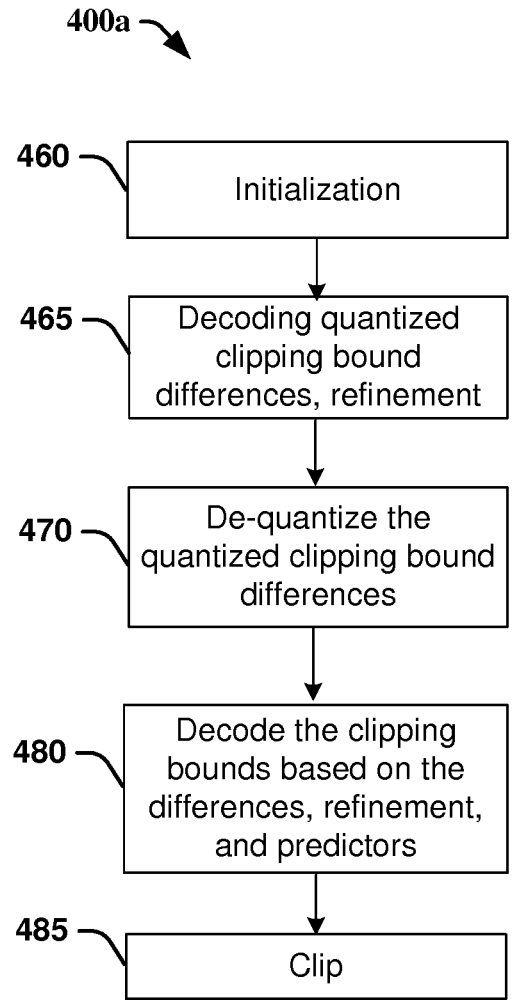
FIG. 4B depicts an exemplary method for decoding clipping bounds, according to an embodiment of the present principles.
Figure 4C:
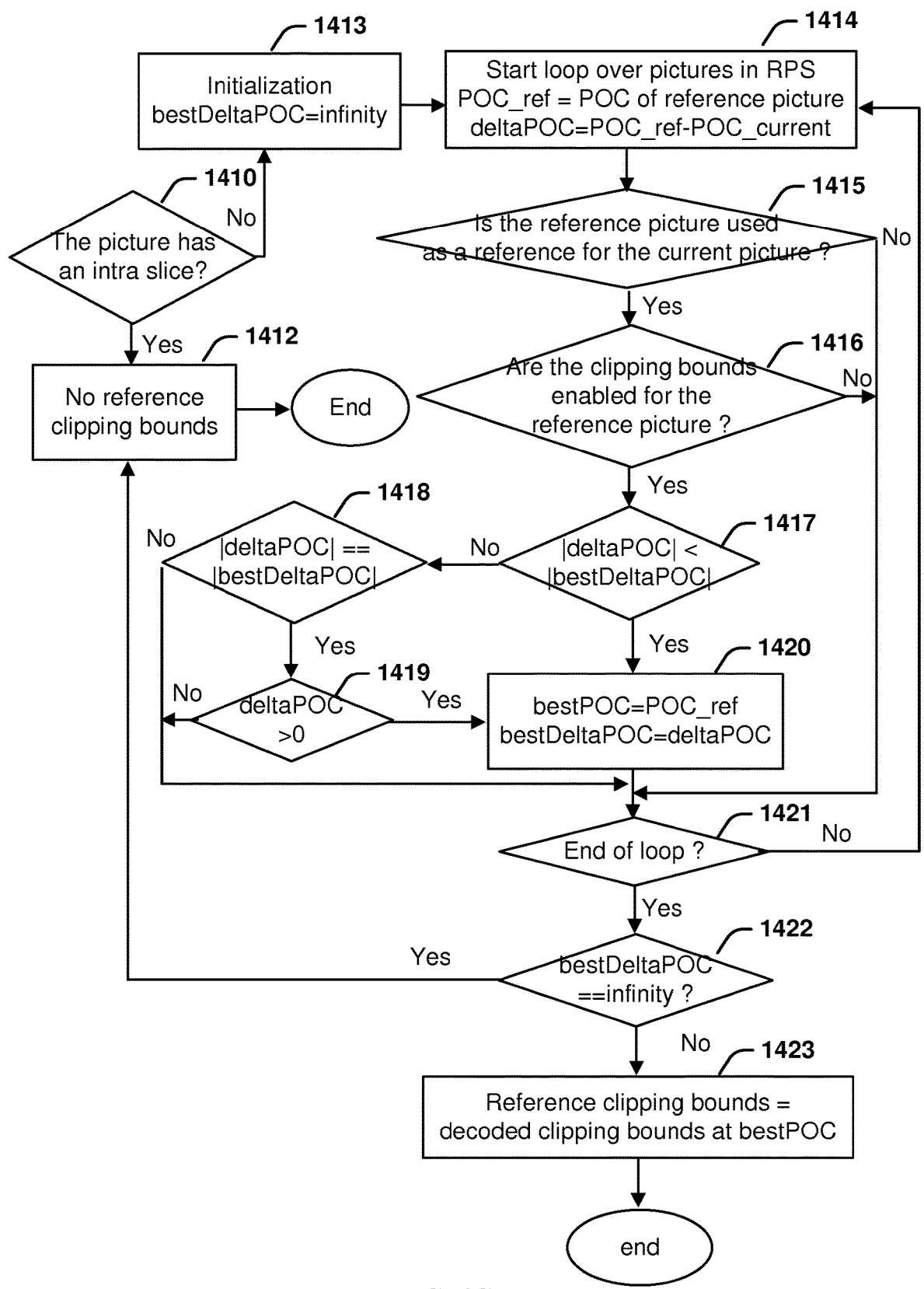
FIG. 4C depicts an exemplary method for initializing reference clipping bounds at the encoder side, according to an embodiment of the present principles.

FIG. 4B depicts an exemplary method 400a for decoding clipping bounds, according to an embodiment of the present principles. The input of method 400a may be an output of method 400. At step 460, the decoder performs initializations, for example, accessing the bit depth (bitdepth) used to represent the video data, the predictors of the clipping bounds, and the number of bits of a quantizer used to quantize the clipping parameters. At step 465, the quantized clipping bound differences and optionally refinement can be decoded from the bitstream. The clipping bounds can be decoded by de-quantizing the quantized clipping bound differences, for example, using Eq. (6) or (11), based on the decoded differences and the predictors for clipping bounds. If refinement is used, the refined is also combined with the initially decoded clipping bounds to obtain the final clipping bounds (480). Then the video data is clipped (485) based on the decoded clipping bounds.

Figure 4D:
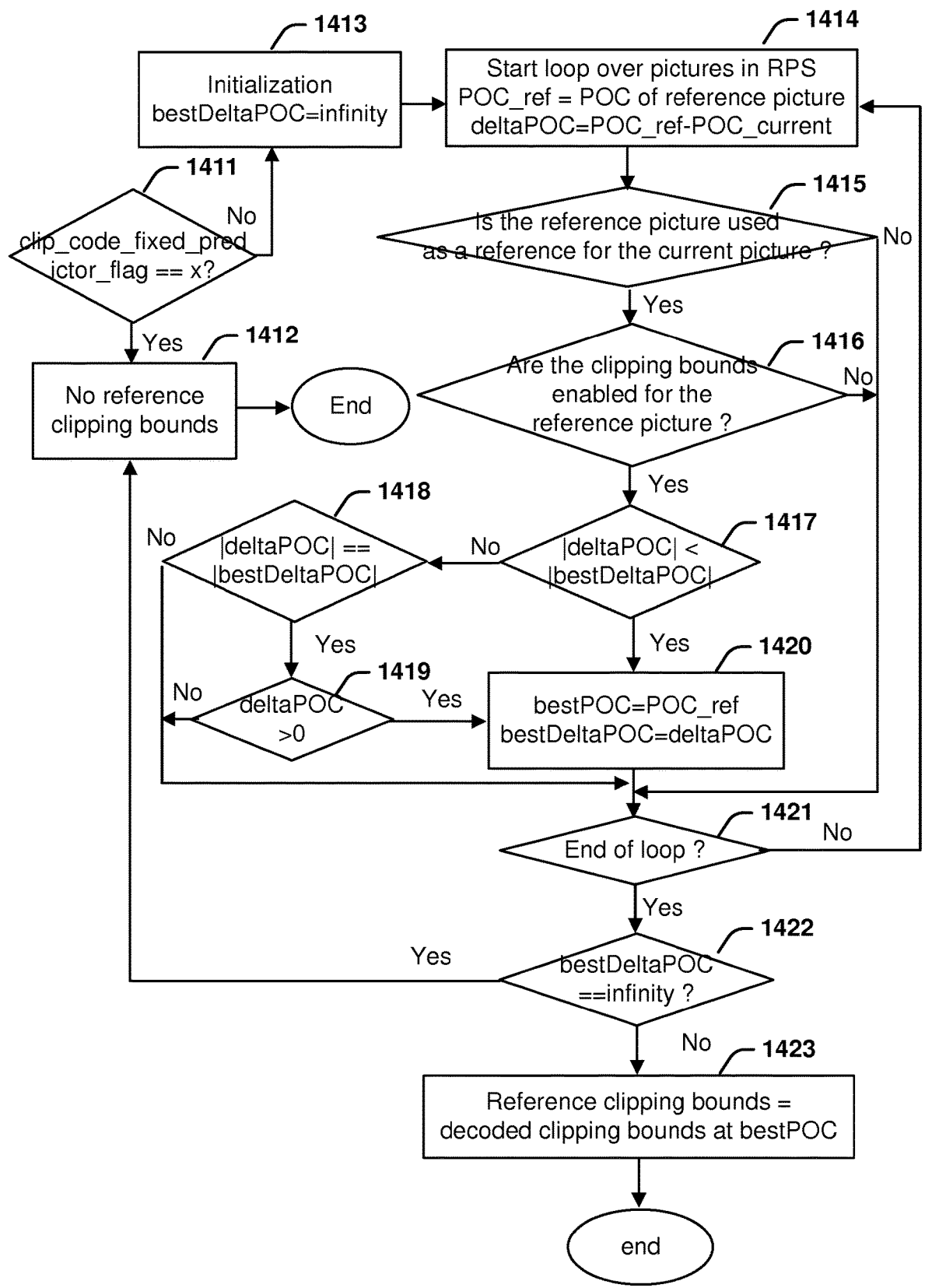
FIG. 4D depicts an exemplary method for initializing reference clipping bounds at the decoder side, according to an embodiment of the present principles.

FIG. 4D depicts an exemplary method of initialization for deriving the reference predictors when the clipping values are stored at slice/picture level and accessed with a policy compatible with the policy to access the frames in the Reference Picture List, according to an embodiment of the present principles. When using this policy, already decoded clipping bounds attached to an already decoded picture as well as the corresponding POC of the said picture are stored in the Reference Picture Set (RPS). The method is similar to the one of the encoder described with reference to FIG. 4C. The steps identical to the steps of FIG. 4C are identified with identical numeral references and are not further described. On the decoder side, the derivation of the reference clipping bounds from the values stored in the RPS only takes place when (1411) the clip_code_fixed_predictor_flag has a value equal to x (e.g., x=0 or x=1), a value x for clip_code_fixed_predictor_flag indicating that fixed clipping predictors are used.

Figure 6:
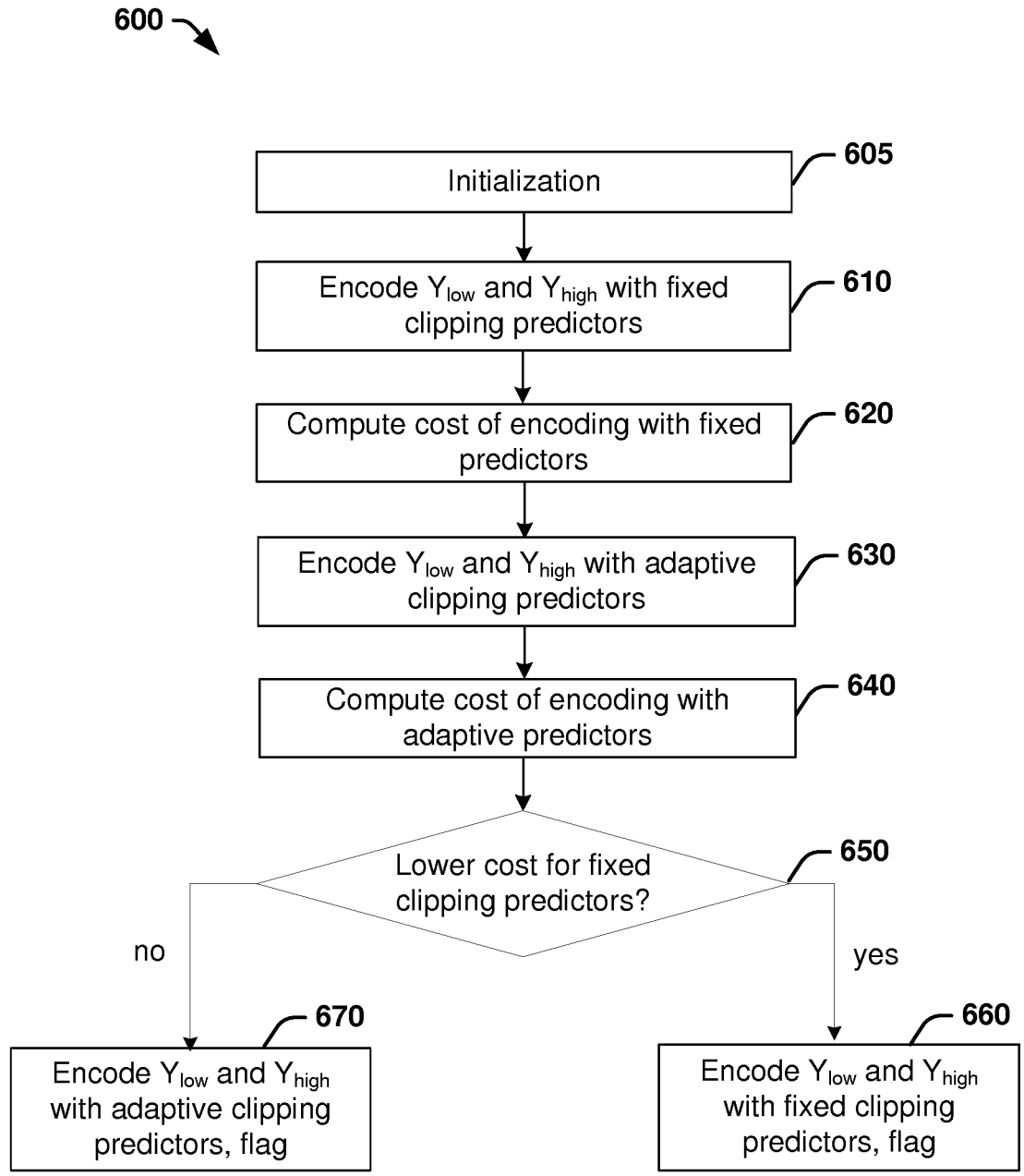
FIG. 6 illustrates an exemplary method for encoding clipping bounds with fixed predictors or adaptive predictors, according to an embodiment of the present principles.

FIG. 6 illustrates an exemplary method 600 for encoding clipping bounds with fixed predictors or adaptive predictors, according to an embodiment of the present principles. At initialization step (605), the encoder may access the bit depth used to represent the video data, and generate fixed predictors for lower and upper clipping bounds, respectively. At step 610, the encoder encodes the clipping bounds with fixed predictors, for example, using method 400 with the difference calculated as described in Eq. (4). At step 620, the encoding cost with fixed predictors is calculated.

At step 630, the encoder encodes the clipping bounds with adaptive predictors, for example, using method 400 with the difference calculated as described in Eq. (7). At step 640, the encoding cost with adaptive predictors is calculated. At step 650, the encoder compares the encoding costs for the method with fixed predictors and adaptive predictors. If the encoding method with fixed clipping predictors has a lower cost, then a flag is encoded to indicate that fixed clipping predictors are used, for example, by setting clip_code_fixed_predictor_flag=1. Since the fixed predictors usually can be generated at the decoder, the fixed predictors are not encoded into the bitstream, and only the quantized clipping bound differences and optional refinements are encoded, for example, using CodeClipping_fixed_predictor( ) as described above. Otherwise, a flag is encoded to indicate that adaptive clipping predictors are used, for example, by setting clip_code_fixed_predictor_flag=0, and the clipping bounds are encoded with adaptive predictors, for example, using the syntax structure CodeClipping_adaptive_predictor( ) as described above.

In the above, we describe that the encoder may decide whether to enable adaptive clipping as shown in FIG. 3. In addition, even if the encoder initially decides to enable adaptive clipping, the encoder may also check if the errors between the clipping bounds before encoding and the reconstructed clipping bounds exceeds a threshold, for example, by checking the error caused by representing $A_d$ and $B_d$ with a bit depth of ($bd_d$=bitdepth−1) instead of bitdepth.

Figure 7:
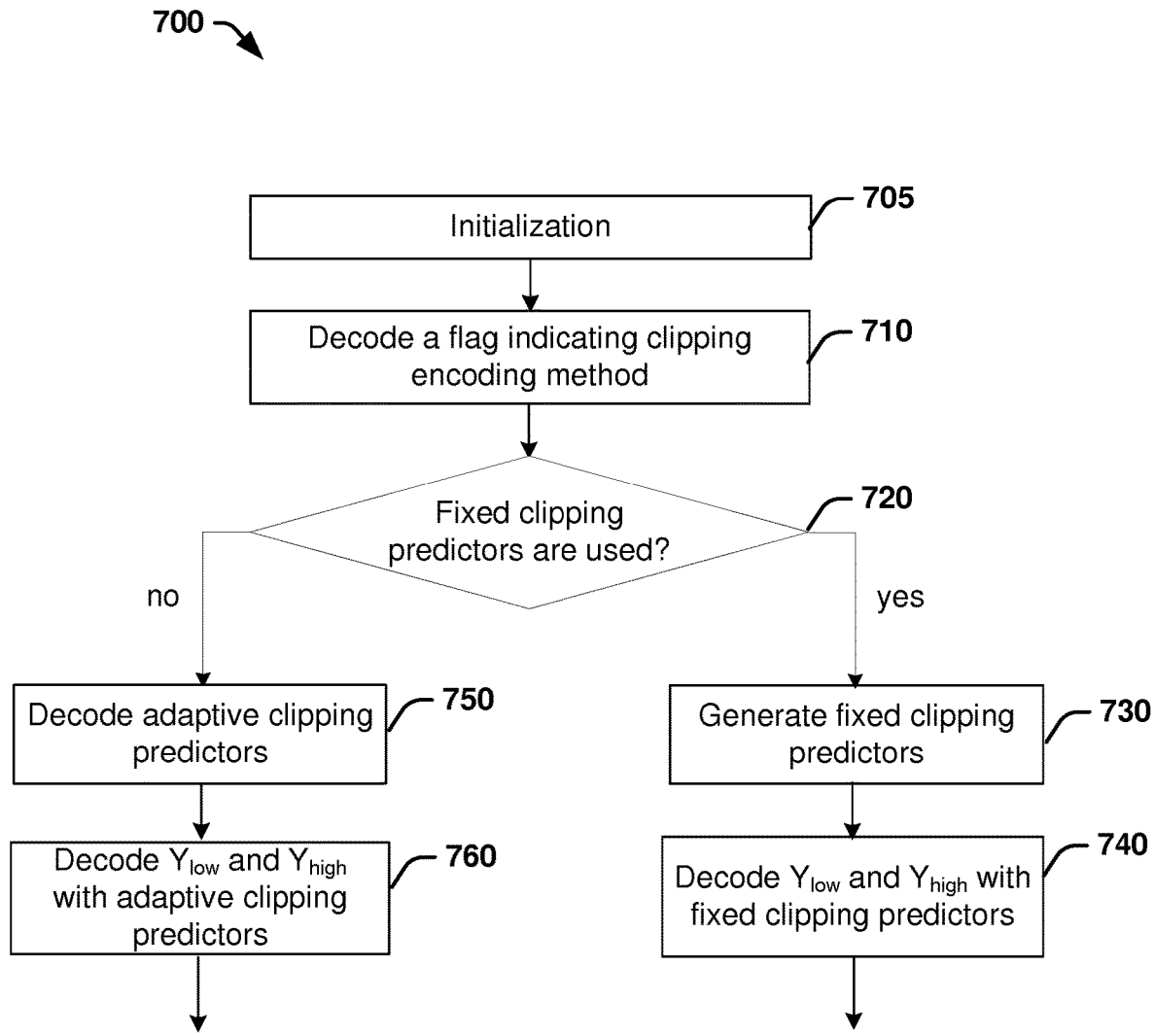
FIG. 7 illustrates an exemplary method for decoding the clipping bounds with fixed predictors or adaptive predictors, according to an embodiment of the present principles.

FIG. 7 illustrates an exemplary method 700 for decoding the clipping bounds with fixed predictors or adaptive predictors, according to an embodiment of the present principles. The input of method 700 may be the output of method 600. At initialization (705), the decoder may access the bit depth used to represent the video data. At step 710, the decoder decodes the flag indicating whether fixed clipping predictors are used or not. If yes (720), the decoder generates fixed predictors for lower and upper clipping bounds, respectively, for example, based on the bit depth at step 730.

Then the clipping bounds can be decoded at step 740, for example, using method 400a with fixed predictors.

Otherwise, the decoder decodes from the bitstream adaptive predictors for lower and upper clipping bounds, respectively, at step 750. Then the clipping bounds can be decoded at step 760, for example, using method 400a with adaptive predictors.

In encoding method 600, adaptive predictors can be explicitly transmitted in the bitstream, or can be derived based on previously encoded picture. For example, the adaptive predictors for the current slice is based on the closest decoded frame as described above. When the adaptive predictors are derived based on previously encoded picture, a first coding unit in a group of pictures is usually encoded with fixed predictors. The decoding method 700 should be designed accordingly to properly decode the adaptive predictors.

Adaptive Residual Smoothing

Figure 8A:
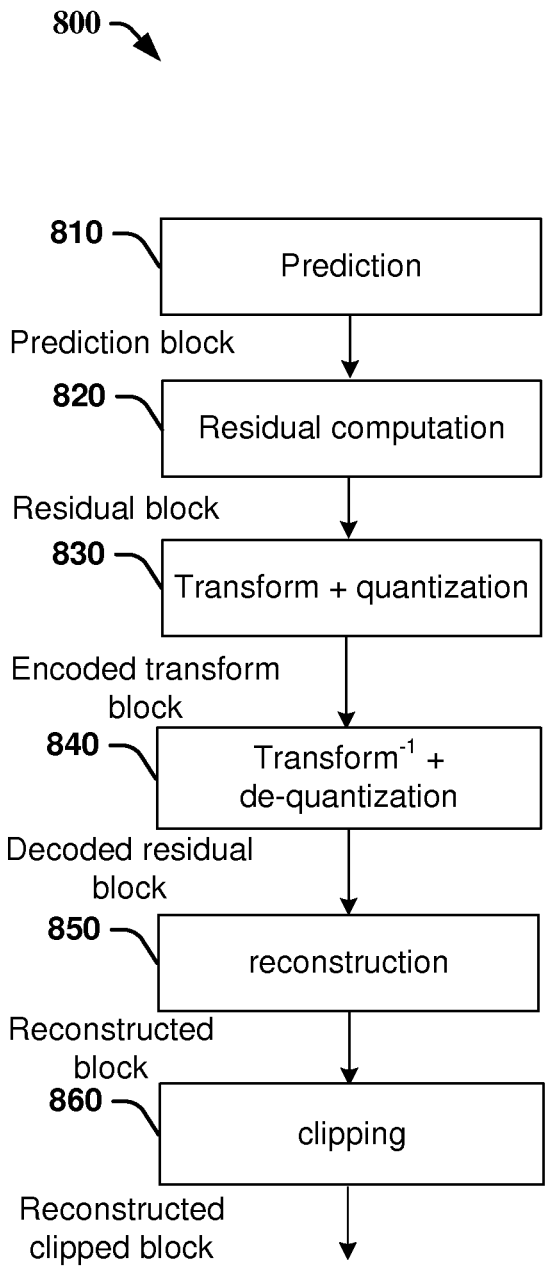
FIG. 8A illustrates an exemplary method for encoding a current block.

FIG. 8A illustrates an exemplary method 800 for encoding a current block. At step 810, a prediction block is formed, for example, through intra prediction or inter prediction. At step 820, a residual block can be calculated as the difference between the current original block and the prediction block. At step 830, the residual block is transformed and quantized to form the encoded transform block. At step 840, the encoded transform block is inverse transformed and de-quantized to form a decoded residual block. At step 850, a reconstructed block can be obtained by summing up the decoded residual block and the prediction block. At step 860, clipping may be performed to generate the reconstructed clipped block.

Using a 3×3 block as an example, we discuss the encoding method in the following in further detail.

We assume the original block $$Y_0 = [y_{i,j}]_{i=0,1,2, j=0,1,2} = \begin{bmatrix} 1000 & 700 & 500 \\ 800 & 1000 & 700 \\ 600 & 500 & 500 \end{bmatrix}$$

and the prediction block $$P_0 = \begin{bmatrix} 980 & 400 & 400 \\ 300 & 1020 & 400 \\ 400 & 400 & 400 \end{bmatrix}.$$

Then the residual block $$Res_0 = Y_0 - P_0 = [res_{i,j}]_{i=0,1,2, j=0,1,2} = \begin{bmatrix} 20 & 300 & 100 \\ 500 & -20 & 300 \\ 200 & 100 & 100 \end{bmatrix}.$$

After transform and quantization, the encoded transformed block $$TQ_0 = \begin{bmatrix} 4 & 1 & 1 \\ 0 & 0 & 0 \\ 0 & 0 & -2 \end{bmatrix}.$$

After inverse transform and inverse quantization, the decoded residual block $$QT_0 = \begin{bmatrix} 219 & 203 & 110 \\ 352 & -62 & 243 \\ 219 & 203 & 110 \end{bmatrix}.$$

The reconstructed block can be calculated as $$Rec_0 = QT_0 + P_0 = \begin{bmatrix} 1199 & 603 & 510 \\ 652 & 958 & 643 \\ 619 & 603 & 510 \end{bmatrix}.$$

With an upper clipping bound as 1000, the reconstructed clipped block $$RC_0 = \begin{bmatrix} 1000 & 603 & 510 \\ 652 & 958 & 643 \\ 619 & 603 & 510 \end{bmatrix}.$$

The distortion between the original block and the reconstructed clipped block is $Dist_0=5277$.

From the above example, we notice that because of the variation among the residual coefficients (i.e., elements in matrix $Res_0$), there is a non-zero transform coefficient (i.e., −2 in matrix $TQ_0$) at the highest frequency of the transformed block. Because it is usually expensive to encode non-zero high-frequency transform coefficient, we propose to smooth the residuals to reduce the occurrence of non-zero coefficients at the high frequency. For example, we may increase the value of a residual if the value of a corresponding pixel in the original block is close to the upper clipping bound, or decrease the value of a residual if the value of a corresponding pixel in the original block is close to the lower clipping bound. Because the increase or decrease in the residual value may smooth the residuals without changing much the reconstructed pixel value after clipping, the encoder may reduce the bitrate in encoding the prediction residuals without incurring much additional distortion.

Figure 8B:
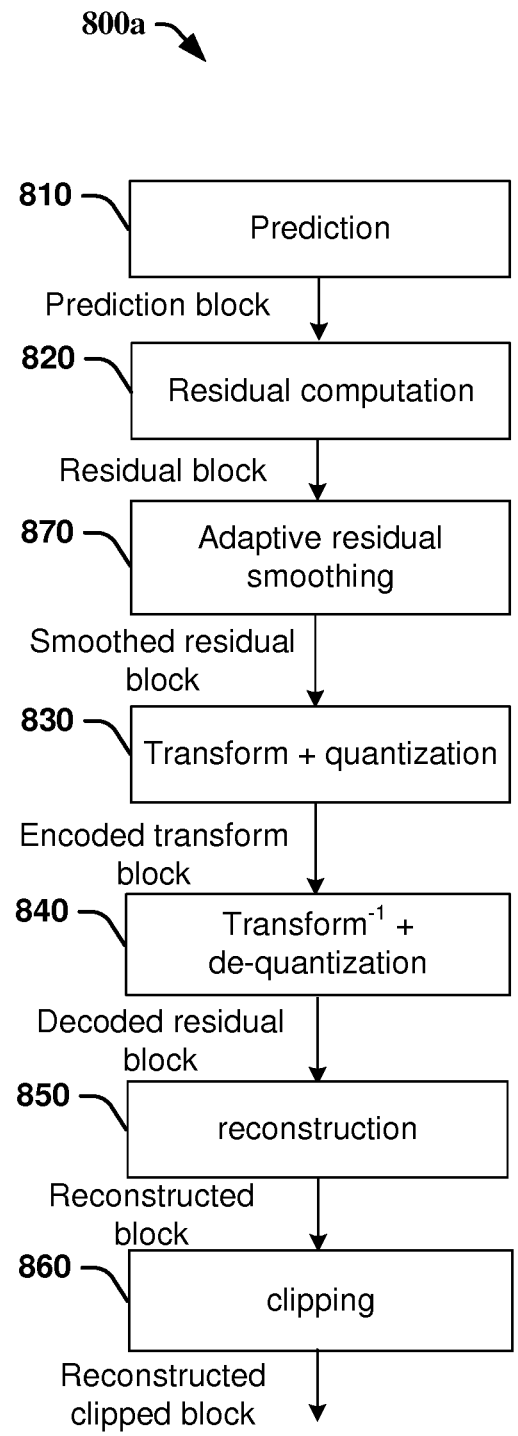
FIG. 8B illustrates an exemplary method for encoding a current block with adaptive residual smoothing, according to an embodiment of the present principles.

FIG. 8B illustrates an exemplary method 800a for encoding a current block with adaptive residual smoothing, according to an embodiment of the present principles. Steps 810-860 are similar to what are used in method 800, while an additional step 870 performs adaptive residual smoothing.

Using the same original block as used for method 800, we discuss the encoding method with residual smoothing in the following.

For the original block $$Y_0 = \begin{bmatrix} 1000 & 700 & 500 \\ 800 & 1000 & 700 \\ 600 & 500 & 500 \end{bmatrix},$$

and the prediction block $$P_0 = \begin{bmatrix} 980 & 400 & 400 \\ 300 & 1020 & 400 \\ 400 & 400 & 400 \end{bmatrix},$$

the residual block $$Res_0 = \begin{bmatrix} 20 & 300 & 100 \\ 500 & -20 & 300 \\ 200 & 100 & 100 \end{bmatrix}$$

is adjusted using adaptive residual smoothing. In particular, $y_{0,0}=1000$ and $y_{1,1}=1000$ are at the upper clipping boundary, and we check the residuals at the corresponding positions (i.e., $res_{0,0}=20$ and $res_{1,1}=-20$). For these two chosen positions, we calculate low-pass filtered values, for example, using an average of the entire block $Res_0$ excluding the chosen positions (i.e., $res_{0,0}$ and $res_{1,1}$). For this example, a low-pass filtered value is calculated as V=(300+100+500+300+200+100+100)/7=229. Because V is greater than $res_{0,0}$ and $res_{1,1}$, we replace the residuals $res_{0,0}$ and $res_{1,1}$ with V as the increases (i.e., V−$res_{0,0}$=219 and V−$res_{1,1}$=259) may be cancelled out at the clipping stage at the upper clipping bound. Thus, even the residuals are smoothed and modified, after the reconstructed block is clipped, the distortion for the block may not necessarily increase as compared with the one without residual smoothing. Therefore, we may improve the compression efficiency by taking advantage of the clipping process.

Then the residual block after adaptive residual smoothing becomes $$Res_1 = \begin{bmatrix} 229 & 300 & 100 \\ 500 & 229 & 300 \\ 200 & 100 & 100 \end{bmatrix}.$$

After transform and quantization, the encoded transformed block $$TQ_1 = \begin{bmatrix} 5 & 1 & 1 \\ 1 & 1 & 0 \\ -1 & 0 & 0 \end{bmatrix}.$$

Different from the encoded transform block $TQ_0$ without adaptive smoothing, the coefficients at the highest frequency is 0 and the energy is more compact on the low frequencies (top left), and thus, may be less costly in terms of the number of bits to encode. After inverse transform and inverse quantization, the decoded residual block $$QT_1 = \begin{bmatrix} 299 & 245 & 190 \\ 339 & 285 & 230 \\ 190 & 136 & 82 \end{bmatrix}.$$

The reconstructed block can be calculated as $$Rec_1 = QT_1 + P_0 = \begin{bmatrix} 1279 & 645 & 590 \\ 639 & 1305 & 630 \\ 590 & 536 & 482 \end{bmatrix}.$$

With an upper clipping bound as 1000, the reconstructed clipped block $$RC_1 = \begin{bmatrix} 1000 & 645 & 590 \\ 639 & 1000 & 630 \\ 590 & 536 & 482 \end{bmatrix}.$$

The distortion between the original block and the reconstructed clipped block is $Dist_1=4852$, which is smaller than $Dist_0$ without residual smoothing. Therefore, adaptive residual smoothing may save the bits while also reducing the distortion.

Figure 9:
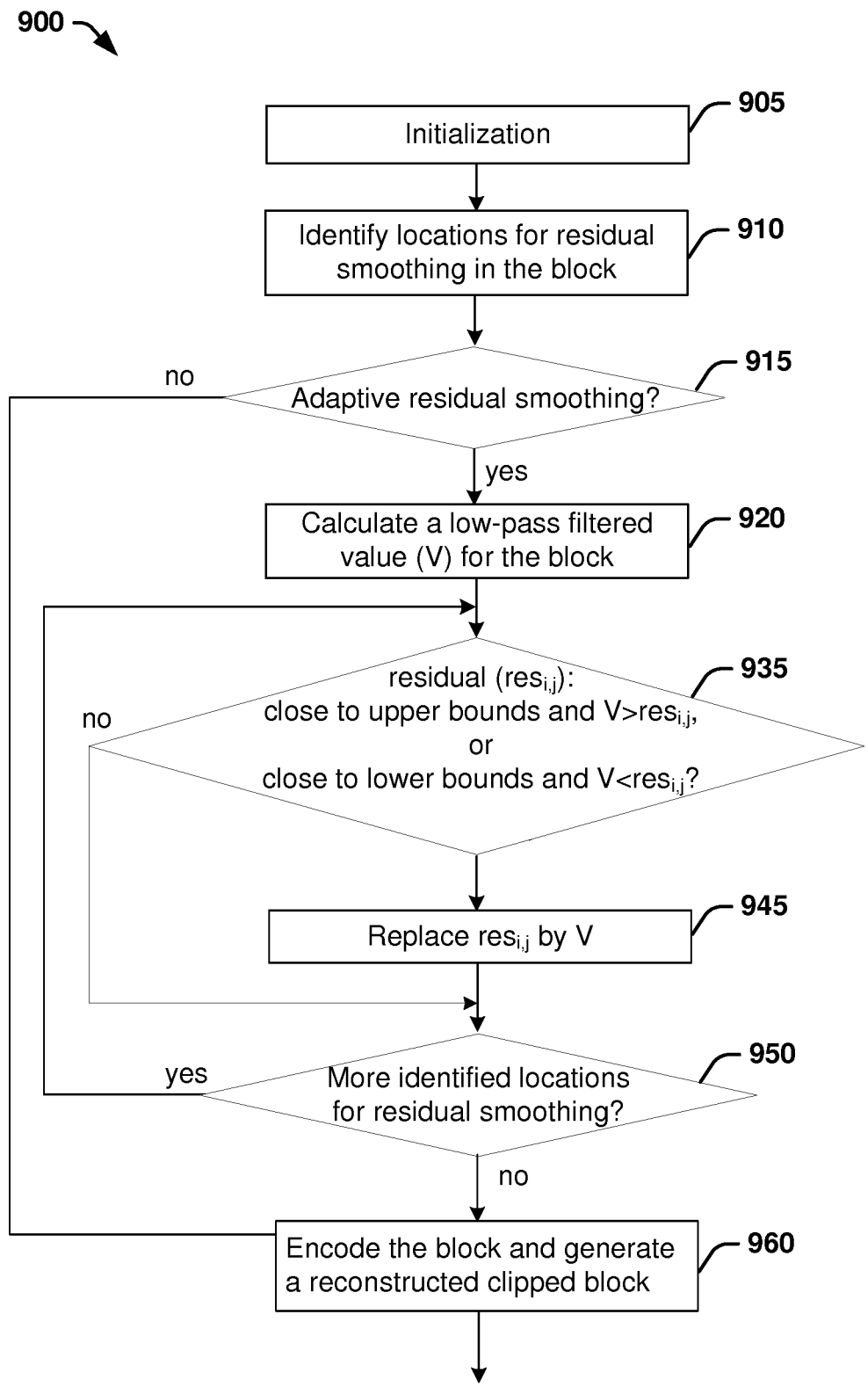
FIG. 9 illustrates an exemplary method for performing residual smoothing in an encoder, according to an embodiment of the present principles.

FIG. 9 illustrates an exemplary method 900 for performing residual smoothing in an encoder, according to an embodiment of the present principles. At step 905, the encoder performs initialization, for example, accessing the lower and upper clipping bounds, accessing the original input block, the prediction block, and the residual block. At step 910, the encoder identifies the locations in the block that would perform residual smoothing, for example, by choosing the locations whose pixel values in the original block or the prediction block are close to the lower or upper clipping bounds by comparing with one or more thresholds. In one example, we may set the threshold to 0, and thus only elements with values exactly at the bounds are smoothed. In another example, the threshold may increase as the quantization parameter increases.

At step 915, the encoder checks whether one or more pixel locations are chosen at step 910. If yes, the encoder calculates (920) a smoothed residual value V for the block, for example, using a low-pass filter or an average of the residuals (excluding the chosen locations) in the block. In a variation, a smooth residual value can be calculated individually for the chosen locations in the block.

Then for a residual value at a current chosen location to be smoothed, the encoder checks (935) whether the location is chosen because the corresponding pixel is close to the upper clipping bound and whether the smoothed residual value V is greater than the current residual, or whether the location is chosen because the corresponding pixel is close to the lower clipping bound and whether the smoothed residual value V is smaller than the current residual. If yes, the current residual $res_{i,j}$ is replaced by the smoothed residual value V. That is, for a residual value that is close to the clipping bounds and may result in high-frequency transform coefficient, we modify the residual value that such it may go well beyond the clipping bounds to reduce the variations in the residual block (thereby compact the energy of the transform block). The excessive residual value caused by residual smoothing can then be confined within the range defined by the clipping bounds after the clipping, and usually does not cause a big increase in distortion. Therefore, the proposed residual smoothing can reduce the encoding cost without increasing much in the distortion, and can usually improve the compression efficiency.

The adaptive residual smoothing may be performed iteratively. For example, for the residual block $$Res_0 = \begin{bmatrix} 20 & 300 & 100 \\ 500 & -20 & 300 \\ 200 & 100 & 100 \end{bmatrix},$$

in the first iteration, the average of the block may be calculated ($V_0$=(20+300+100+500−20+300+200+100+100)/9=178) and used to replace $res_{0,0}$ and $res_{1,1}$, and the residual block becomes $$Res_0^1 = \begin{bmatrix} 178 & 300 & 100 \\ 500 & 178 & 300 \\ 200 & 100 & 100 \end{bmatrix}.$$

In the second iteration, the average of the block may be calculated ($V_1$=(178+300+100+500+178+300+200+100+100)/9=218) and used to replace $res_{0,0}^1$ and $res_{1,1}^1$, and the residual block becomes $$Res_0^2 = \begin{bmatrix} 218 & 300 & 100 \\ 500 & 218 & 300 \\ 200 & 100 & 100 \end{bmatrix}.$$

The iterations may continue until when the number of iterations reaches a threshold or $Res_0^{i+1=Res_0^i}$.

At step 950, the encoder checks whether there are more identified locations to be processed. If yes, the control returns to step 935. Otherwise, the modified residual block is encoded and a decoded clipped block is reconstructed, for example, using steps 830-860 in method 800a. The encoder may also perform rate-distortion optimization (RDO) to decide whether adaptive residual smoothing is to be used or not.

In the above, we describe encoding and decoding methods for lower and upper clipping bounds or applying adaptive residual smoothing based on the lower and upper clipping bounds. In different variations, we may perform encoding and decoding for, or perform residual smoothing based on, just the lower or upper clipping bound.

Various embodiments are described with respect to the HEVC standard. However, the present principles are not limited to HEVC, and can be applied to other standards, recommendations, and extensions thereof.

Various methods are described above, and each of the methods comprises one or more steps or actions for achieving the described method. Unless a specific order of steps or actions is required for proper operation of the method, the order and/or use of specific steps and/or actions may be modified or combined.

Figure 10:
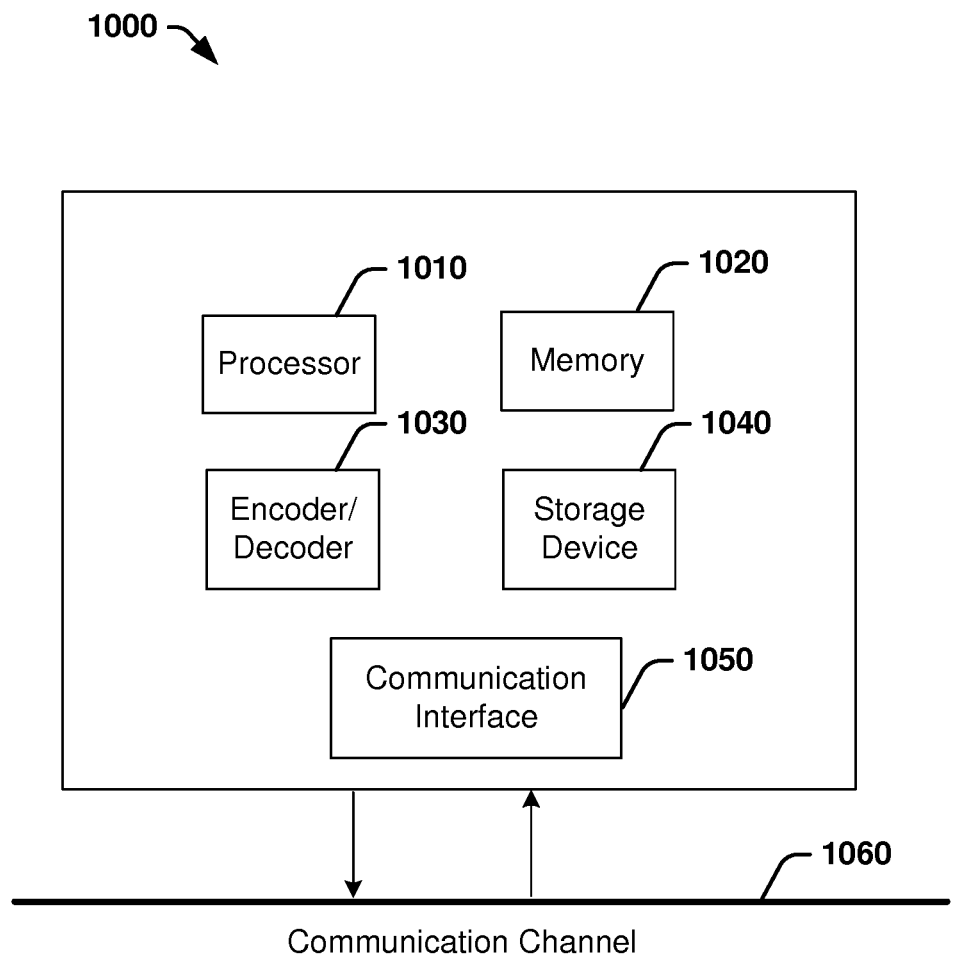
FIG. 10 illustrates a block diagram of an exemplary system in which various aspects of the exemplary embodiments of the present principles may be implemented.

FIG. 10 illustrates a block diagram of an exemplary system in which various aspects of the exemplary embodiments of the present principles may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1000 may be communicatively coupled to other similar systems, and to a display via a communication channel as shown in FIG. 10 and as known by those skilled in the art to implement the exemplary video system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1040, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include an encoder/decoder module 1030 configured to process data to provide an encoded video or decoded video.

Encoder/decoder module 1030 represents the module(s) that may be included in a device to perform the encoding and/or decoding functions. As is known, a device may include one or both of the encoding and decoding modules. Additionally, encoder/decoder module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments of the present principles, one or more of the processor(s) 1010, memory 1020, storage device 1040 and encoder/decoder module 1030 may store one or more of the various items during the performance of the processes discussed herein above, including, but not limited to the base layer input video, the enhancement layer input video, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments according to the present principles may be carried out by computer software implemented by the processor 1010 or by hardware, or by a combination of hardware and software. As a non-limiting example, the exemplary embodiments according to the present principles may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for encoding a picture, comprising:
accessing a block to be encoded, a prediction block and a residual block corresponding to the block to be encoded;
determining that a first element in the block or the prediction block is close to or equal to an upper bound for clipping;
obtaining a low-pass filtered value of the residual block;
accessing a first element in the residual block corresponding to the first element in the block to be encoded or the prediction block;
determining whether the low-pass filtered value is greater than the first element in the residual block;
replacing the first element in the residual block with the low-pass filtered value of the residual block, responsive to determining that the low-pass filtered value is greater than the first element in the residual block;
encoding and decoding the residual block with the replaced element to form a decoded residual block;
forming a reconstructed block based on the prediction block and the decoded residual block; and
replacing a first element in the reconstructed block corresponding to the first element in the residual block with the upper bound for clipping, responsive to the first element in reconstructed block exceeding the upper bound for clipping.

2. The method of claim 1, further comprising:
determining that a second element in the block or the prediction block is close to a lower bound for clipping;
replacing a second element in the residual block corresponding to the second element in the block or the prediction block with a second value that is smaller than the second element in the residual block; and
replacing a second element in the reconstructed block corresponding to the second element in the residual block with the lower bound for clipping, responsive to the second element in the reconstructed block being smaller than the lower bound for clipping.

3. The method of claim 2, wherein the second value is the low-pass filtered value of the residual block.

4. The method of claim 1, wherein the determining that the first element in the block or the prediction block is close to an upper bound for clipping is based on a threshold.

5. The method of claim 4, wherein the threshold increases with a quantization parameter corresponding to the residual block.

6. The method of claim 1, wherein the low-pass filtered value is obtained as an average of the residual block, excluding one or more elements in the residual block that are determined to be close to or equal to the upper bound for clipping.

7. An apparatus for encoding a picture, comprising:
at least one memory and one or more processors coupled to the at least one memory, the one or more processors being configured to:
access a block to be encoded, a prediction block and a block corresponding to the block to be encoded;
determine that a first element in the block or the prediction block is close to or equal to an upper bound for clipping;
obtain a low-pass filtered value of the residual block;
access a first element in the residual block corresponding to the first element in the block to be encoded or the prediction block;
determine whether the low-pass filtered value is greater than the first element in the residual block;
replace the first element in the residual block with the low-pass filtered value of the residual block, responsive to determining that the low-pass filtered value is greater than the first element in the residual block;
encode and decode the residual block with the replaced element to form a decoded residual block;
form a reconstructed block based on the prediction block and the decoded residual block; and
replace a first element in the reconstructed block corresponding to the first element in the residual block with the upper bound for clipping, responsive to the first element in the reconstructed block exceeding the upper bound for clipping.

8. The apparatus of claim 7, the one or more processors being further configured to:
determine that a second element in the block or the prediction block is close to a lower bound for clipping;
replace a second element in the residual block corresponding to the second element in the block or the prediction block with a second value that is smaller than the second element in the residual block; and
replace a second element in the reconstructed block corresponding to the second element in the residual block with the lower bound for clipping responsive to the second element in the reconstructed block being smaller than the lower bound for clipping.

9. The apparatus of claim 8, wherein the second value is the low-pass filtered value of the residual block.

10. The apparatus of claim 7, wherein the one or more processors are configured to determine that the first element in the block or the prediction block is close to an upper bound for clipping is based on a threshold.

11. The apparatus of claim 10, wherein the threshold increases with a quantization parameter corresponding to the residual block.

12. The apparatus of claim 7, wherein the low-pass filtered value is obtained as an average of the residual block, excluding one or more elements in the residual block that are determined to be close to or equal to the upper bound for clipping.

13. A non-transitory computer readable medium having stored thereon computer executable instructions that, when executed, implement a method for encoding a picture, the method comprising:
accessing a block to be encoded, a prediction block and a residual block corresponding to the block to be encoded;
determining that a first element in the block or the prediction block is close to or equal to an upper bound for clipping;
obtaining a low-pass filtered value of the residual block;
accessing a first element in the residual block corresponding to the first element in the block to be encoded or the prediction block;
determining whether the low-pass filtered value is greater than the first element in the residual block;
replacing the first element in the residual block with the low-pass filtered value of the residual block, responsive to determining that the low-pass filtered value is greater than the first element in the residual block;

encoding and decoding the residual block with the replaced element to form a decoded residual block;

forming a reconstructed block based on the prediction block and the decoded residual block; and replacing a first element in the reconstructed block corresponding to the first element in the residual block with the upper bound for clipping, responsive to the first element in the reconstructed block exceeding the upper bound for clipping.

14. The medium of claim 13, wherein the method further comprising:

determining that a second element in the block or the prediction block is close to a lower bound for clipping;

replacing a second element in the residual block corresponding to the second element in the block or the prediction block with a second value that is smaller than the second element in the residual block; and replacing a second element in the reconstructed block corresponding to the second element in the residual block with the lower bound for clipping, responsive to the second element in the reconstructed block being smaller than the lower bound for clipping.

15. The medium of claim 14, wherein the second value is the low-pass filtered value of the residual block.

16. The medium of claim 13, wherein the determining that the first element in the block or the prediction block is close to an upper bound for clipping is based on a threshold.

17. The medium of claim 16, wherein the threshold increases with a quantization parameter corresponding to the residual block.

18. The medium of claim 13, wherein the low-pass filtered value is obtained as an average of the residual block, excluding one or more elements in the residual block that are determined to be close to or equal to the upper bound for clipping.

* * * * *